United States Patent
Liu et al.

(10) Patent No.: US 10,500,923 B2
(45) Date of Patent: Dec. 10, 2019

(54) SYSTEM AND METHOD FOR OPERATING A HEAT PUMP

(71) Applicant: Ford Global Technologies, LLC, Dearborn, MI (US)

(72) Inventors: Yu Liu, Novi, MI (US); Anthony David Tsakiris, Beverly Hills, MI (US); Brett Allen Dunn, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 99 days.

(21) Appl. No.: 15/659,814

(22) Filed: Jul. 26, 2017

(65) Prior Publication Data

US 2017/0320379 A1    Nov. 9, 2017

Related U.S. Application Data

(62) Division of application No. 14/531,580, filed on Nov. 3, 2014, now Pat. No. 9,764,620.

(51) Int. Cl.
*B60H 1/32* (2006.01)
*B60H 1/00* (2006.01)

(52) U.S. Cl.
CPC ....... *B60H 1/3213* (2013.01); *B60H 1/00921* (2013.01); *B60H 2001/3252* (2013.01); *B60H 2001/3255* (2013.01); *B60H 2001/3272* (2013.01)

(58) Field of Classification Search
CPC .............. B60H 1/3213; B60H 1/00921; B60H 2001/3252; B60H 2001/3255; B60H 2001/3272; F25B 13/00; F25B 30/02; F25B 49/022; F25B 2600/02
USPC .................................................... 62/159, 160
See application file for complete search history.

(56) References Cited

U.S. PATENT DOCUMENTS

| | | | |
|---|---|---|---|
| 5,483,805 A * | 1/1996 | Fujii | B60H 1/00392 62/158 |
| 6,089,034 A | 7/2000 | Lake et al. | |
| 6,092,376 A | 7/2000 | Lake et al. | |
| 6,118,099 A | 9/2000 | Lake et al. | |
| 6,209,331 B1 | 4/2001 | Lake et al. | |
| 2005/0178523 A1 | 8/2005 | Itoh et al. | |
| 2011/0167850 A1 | 7/2011 | Itoh et al. | |
| 2012/0078423 A1* | 3/2012 | Zhou | G05D 23/1902 700/278 |
| 2016/0209099 A1* | 7/2016 | Liu | B60H 1/004 |

\* cited by examiner

*Primary Examiner* — Marc E Norman
(74) *Attorney, Agent, or Firm* — David Kelley; McCoy Russell LLP

(57) ABSTRACT

Methods and system for operating a heat pump in different operating modes and providing a predictable heat pump response when the heat pump is transitioned between the different operating modes are presented. In one example, a controller that includes executable instructions for providing a bumpless compressor command for operating the heat pump is disclosed.

11 Claims, 6 Drawing Sheets

SYSTEM AND METHOD FOR OPERATING A HEAT PUMP

CROSS REFERENCE TO RELATED APPLICATION

The present application is a divisional of U.S. patent application Ser. No. 14/531,580, entitled "SYSTEM AND METHOD FOR OPERATING A HEAT PUMP," filed on Nov. 3, 2014. The entire contents of the above-referenced application are hereby incorporated by reference in its entirety for all purposes.

FIELD

The present description relates to methods and a system for controlling operation of a heat pump of a vehicle. The methods and system may be particularly useful for heat pumps that are operated to heat and cool a vehicle's passenger cabin.

BACKGROUND AND SUMMARY

A heat pump may be configured to heat a vehicle's passenger cabin at low ambient temperatures and cool the vehicle's passenger cabin at higher ambient temperatures. The heat pump may transition from a heating mode to a cooling mode in response to driver input, or in response to automated controller commands that are based on ambient and/or passenger cabin environmental conditions. The heat pump may be transitioned between heating and cooling modes by changing a path that refrigerant flows within the heat pump. Additionally, the heat pump may be controlled responsive to different inputs during different operating modes. As a result, it may be possible for heat pump control signals to change significantly when the heat pump is switched from operating in a heating mode to operating in a cooling mode, or vice-versa. The change in heat pump control signals may be objectionable to vehicle occupants or it may increase degradation of heat pump components. Therefore, it may be desirable to provide a system and method that allows a heat pump to transitions between operating modes in a seamless way.

The inventors herein have recognized the above-mentioned disadvantages and have developed a heat pump method, comprising: commanding a compressor to provide a desired evaporator temperature in response to output of an evaporator temperature controller and output of a refrigerant pressure controller in a first heat pump operating mode; and commanding the compressor to provide a desired heater core temperature in response to output of a heater core temperature controller and output of the refrigerant pressure controller in a second heat pump operating mode.

By combining outputs of two controllers in one mode and two different controllers in a second mode, it may be possible to provide the technical result of providing a bumpless or seamless change in heat pump operation during a heat pump mode change. In one example, output of two controllers is adjusted based on output of at least one different controller so that controllers outputting commands for a control mode being entered are adjusted to command values that maintain a compressor command before and after the heat pump changes operating modes. In this way, a sum of output of controllers providing output for a new heat pump operating mode may match or equal a sum of output of controllers supplying commands for a different heat pump operating mode so that a heat pump compressor speed is not substantially changed during a transition or change from one heat pump mode to a next heat pump mode.

The present description may provide several advantages. Specifically, the approach may improve heat pump mode transitions. Additionally, the approach may improve heat pump durability. Further, the approach may reduce objectionable noise of a vehicle that includes a heat pump.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
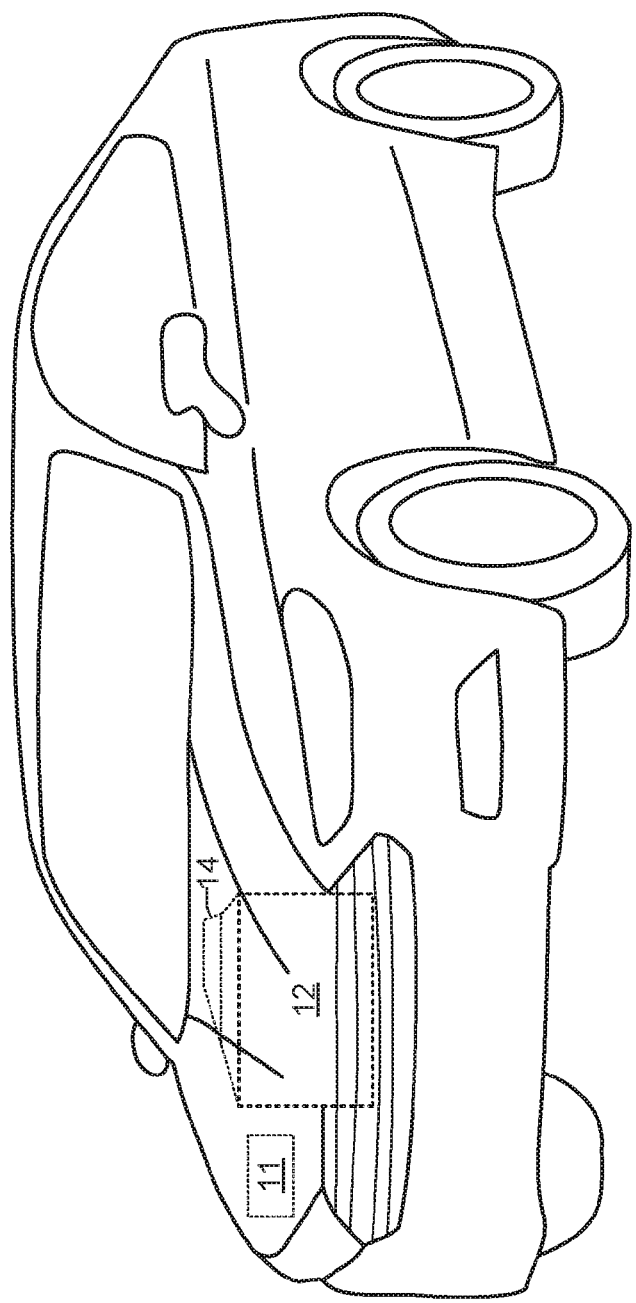
FIG. 1 is a schematic diagram of a vehicle.
Figure 2:
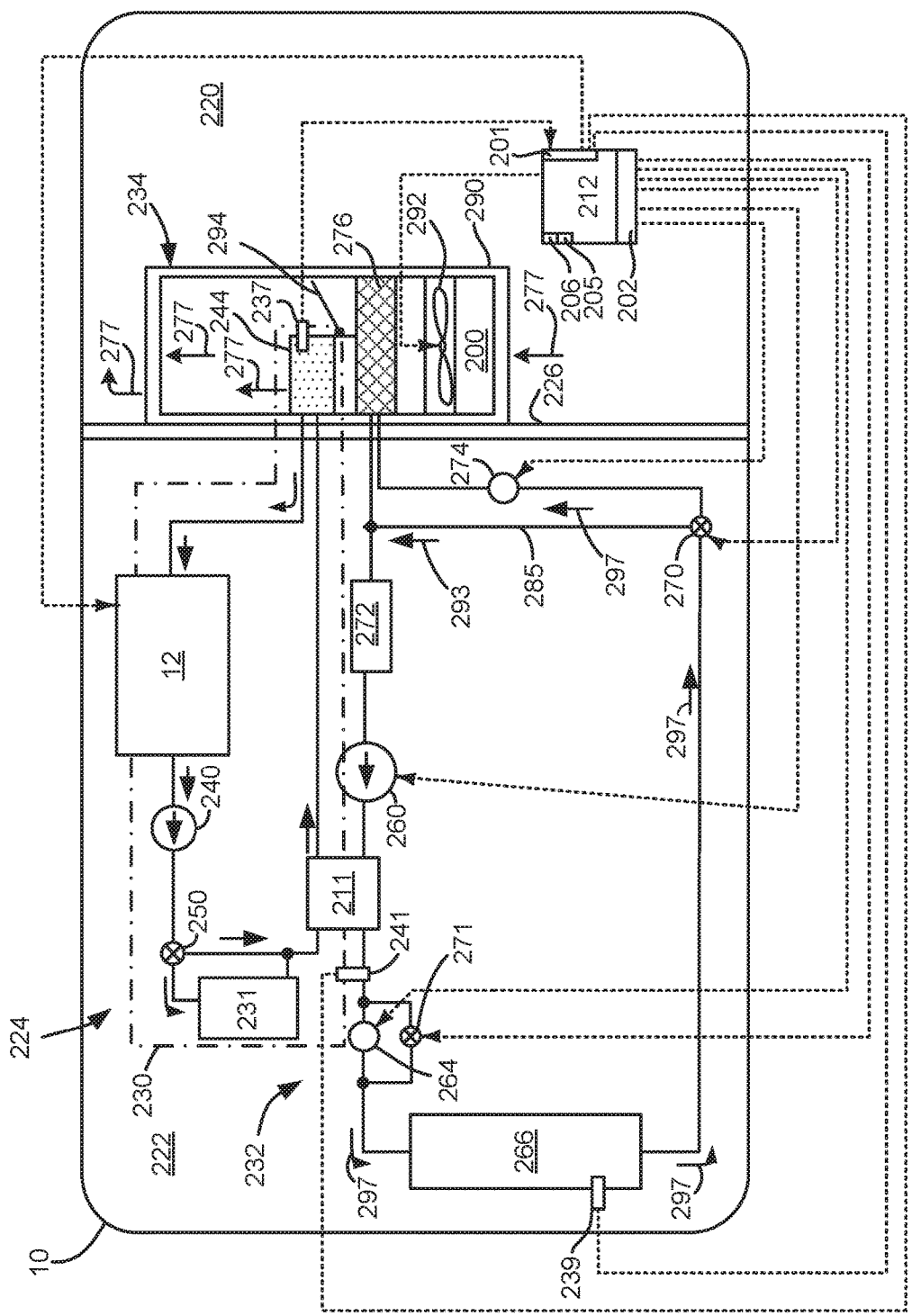
FIG. 2 shows an example vehicle climate control system for the vehicle of FIG. 1.
Figure 3:
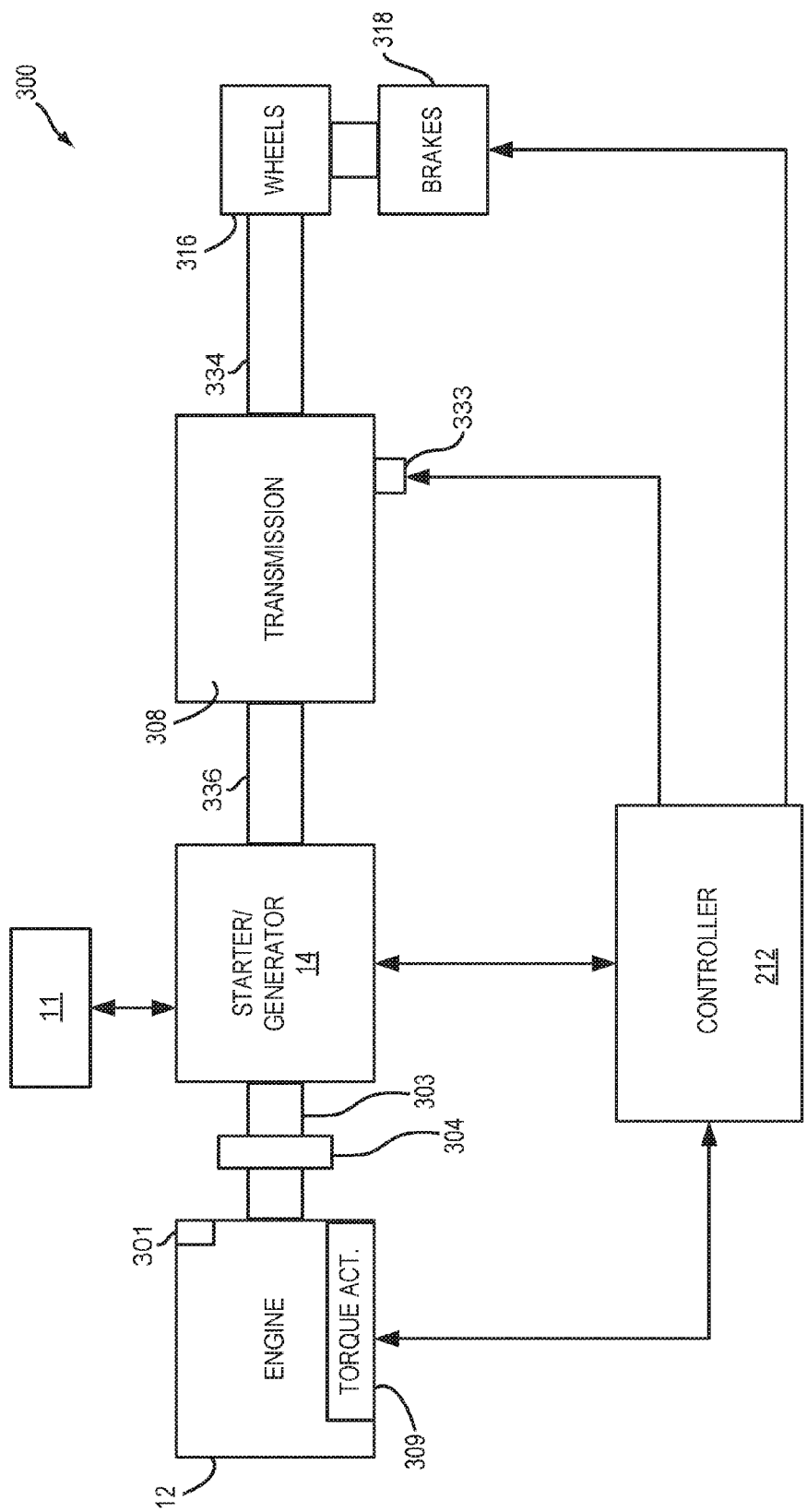
FIG. 3 shows an example vehicle driveline for the vehicle of FIG. 1.

The present description is related to operating a heat pump of a vehicle and transitioning the heat pump between its different operating modes. The vehicle may be a passenger vehicle as is shown in FIG. 1 or a commercial vehicle (not shown). The vehicle includes a climate control system including a heat pump as is shown in FIG. 2. The climate control system may include an engine that is part of a hybrid powertrain as is shown in FIG. 3. The heat pump may be operated by a controller as is shown in the block diagram of FIG. 4. The heat pump may transition between heating and cooling modes or vice-versa as is shown in the operating sequence of FIG. 5. The heat pump may be operated according to the method of FIG. 6 to ease transitions between heating and cooling modes.

Referring to FIG. 1, a vehicle 10 including an engine 12, an electrical machine 14, and an electrical energy storage device 11 is shown. In one example, the vehicle may be propelled solely via the engine 12, solely via the electrical machine 14, or by both the engine 12 and the electrical machine 14. The electrical machine 14 may be supplied electrical power via the electrical energy storage device 11. The electrical energy storage device 11 may also be recharged via engine 12 providing power to electrical machine 14 and electrical machine outputting electrical energy to electric energy storage device 11. Alternatively, electrical energy storage device may be recharged via converting the vehicle's kinetic energy into electrical energy via electrical machine 14 during vehicle deceleration or hill descent. Electrical energy storage device 11 may also be recharged from a stationary electrical power grid 17 via a home charging system or a remote charging system (e.g., a charging station) and electrical conductor 18. In one example, electrical energy storage device 11 is a battery. Alternatively, electrical energy storage device 11 may be a capacitor or other electric energy storage device.

Referring now to FIG. 2, a vehicle heating system or climate control system 224 is shown. Devices and fluidic passages or conduits are shown as solid lines. Electrical connections are shown as dashed lines.

The vehicle 10 may include a driveline as shown in FIG. 3 or another suitable driveline to propel the vehicle 10 and/or power vehicle components. Vehicle 10 is shown with internal combustion engine 12, and it may be selectively coupled to an electric machine (not shown). Internal combustion engine 12 may combust petrol, diesel, alcohol, hydrogen, or a combination of fuels.

The vehicle 10 may include a passenger compartment or cabin 220, an engine compartment 222, and a climate control system 224. The passenger compartment 220 may be within vehicle 10 and it may receive one or more occupants. A portion of climate control system 224 may be positioned in passenger compartment 220.

Engine compartment 222 may be positioned proximate to passenger compartment 220. One or more power sources, such as internal combustion engine 12, as well as a portion of climate control system 224 may be within engine compartment 222. Engine compartment 222 may be isolated from the passenger compartment 220 via bulkhead 226. The climate control system 224 may circulate air and/or control or modify the temperature of air that is circulated in the passenger compartment 220. Further, the internal combustion engine 12 may be heated via climate control system 224 to reduce fuel consumption and emissions. The climate control system 224 may include a coolant subsystem 230, a heat pump subsystem 232, and ventilation subsystem 234.

The coolant subsystem 230, which may also be referred to as a coolant loop, may circulate a coolant, such as glycol, to cool the internal combustion engine 12. For example, waste heat that is generated by the internal combustion engine 12 when the engine is running or operational may be transferred to the coolant and then circulated to radiator 231 to cool internal combustion engine 12. In at least one example, the coolant subsystem 230 may include a coolant pump 240, a heater core 244, and intermediate heat exchanger 211 that may be fluidly interconnected by conduits or passages such as tubes, hoses, pipes, or the like. The coolant subsystem 230 includes radiator 231 for transferring thermal energy to the ambient air surrounding the vehicle 10. The coolant pump 240 may circulate coolant through the coolant subsystem 230. The coolant pump 240 may be powered by an electrical or non-electrical power source. For example, the coolant pump 240 may be operatively coupled to an internal combustion engine 12 via a belt, or alternatively may be driven by an electrically powered motor. The coolant pump 240 may receive coolant from the internal combustion engine 12 and circulate the coolant in a closed loop. Specifically, when the climate control system 224 is in a heating mode, coolant may be routed from the coolant pump 240 to valve 250 and intermediate heat exchanger 211, and then to the heater core 244 before returning to the internal combustion engine 12 as represented by the arrowed lines. When internal combustion engine 12 is outputting a higher level of thermal energy, coolant may flow from pump 240 to radiator 231 before returning to internal combustion engine 12 via heater core 244. Heater core heat sensor 237 provides heater core temperature to controller 212.

The heater core 244 may transfer thermal energy from the coolant to air in the passenger compartment 220. The heater core 244 may be positioned in the passenger compartment 220 in the ventilation subsystem 234 and may have any suitable configuration. For example, the heater core 244 may have a plate-fin or tube-fin construction in one or more examples.

The heat pump subsystem 232 may operate in various modes, including, but not limited to a cooling mode and heating mode. Further, heat pump subsystem may include a plurality of refrigerant circuits that may be isolated from other refrigerant circuits. For example, heat pump subsystem 232 includes a first refrigerant circuit that includes valve 270, expansion valve 274, and interior heat exchanger 276. Heat pump subsystem includes a second refrigerant circuit that includes valve 270 and bypass passage 285. In other variants, heat pump subsystem 232 may include additional refrigerant circuits that provide additional functionality. Thus, heat pump subsystem 232 may include a plurality of refrigerant circuits through which refrigerant passes.

In the cooling mode, the heat pump subsystem 232 may circulate a heat transfer fluid, which may be called a refrigerant, to transfer thermal energy from inside the passenger compartment 220 to outside the passenger compartment 220. Refrigerant may pass through interior heat exchangers 276 during cooling mode. In cooling mode, first control valve 271 is in an open state such that first expansion valve 264 is bypassed. Second control valve 270 directs refrigerant to second expansion valve 274, thereby preventing flow through bypass passage 285.

In a heating mode, the heat pump subsystem 232 may transfer thermal energy from exterior heat exchanger 266 to intermediate heat exchanger 211. Intermediate heat exchanger may be a gas to liquid heat exchanger which allows heat to be transferred to coolant, and the coolant may warm the passenger cabin via heater core 244. In heating mode, first control valve 271 is closed such that first expansion valve 264 expands refrigerant that flows to exterior heat exchanger 266. Second control valve 270 directs refrigerant to bypass passage 285, thereby preventing flow through interior heat exchanger 276.

The pump 260, which may also be called a compressor, may pressurize and circulate the refrigerant through the heat pump subsystem 232. The pump 260 may be powered by an electrical or non-electrical power source. For example, the pump 260 may be operatively coupled to internal combustion engine 12 or driven by an electrically powered motor. The pump 260 may provide high pressure refrigerant to first expansion valve 264 and exterior heat exchanger 266 when first control valve 271 is closed. Refrigerant pressure may be determined via pressure sensor 241. Refrigerant may bypass expansion valve 264 when first control valve 271 is in an open state. In some examples, an oil separator may be placed at the outlet of pump 260. Refrigerant may flow through heat pump subsystem 232 via motive force of compressor 260 in the direction of arrows 297.

The first expansion device 264 may be positioned between and may be in fluidic communication with pump 260 and the exterior heat exchanger 266. Temperature of exterior heat exchanger 266 may be sensed via temperature sensor 239 and input to controller 212. The first expansion device 264 may be provided to change the pressure of the refrigerant. For example, the first expansion device 264 may be a thermal expansion valve (TXV) or a fixed or variable position valve that may or may not be externally controlled. The first expansion device 264 may reduce the pressure of the refrigerant that passes through the first expansion device 264 from the pump 260 to the exterior heat exchanger 266. Therefore, high pressure refrigerant received from the pump 266 may exit the first expansion device 264 at a lower pressure and as a liquid and vapor mixture in the heating mode.

The exterior heat exchanger 266 may be positioned outside the passenger compartment 220. In a cooling mode or air conditioning context, the exterior heat exchanger 266 may function as a condenser and may transfer heat to the surrounding environment to condense the refrigerant from a vapor to a liquid. In a heating mode, the exterior heat exchanger 266 may function as an evaporator and may transfer heat from the surrounding environment to the refrigerant, thereby causing the refrigerant to vaporize.

The second control valve 270 may be positioned between external heat exchanger 266 and second expansion valve 274. The passage between second control valve 270 and second expansion valve 274 allows refrigerant to selectively reach internal heat exchanger 276. In one example, second control valve 270 is a three-way valve that selectively allows refrigerant to flow to second expansion valve 274 or bypass passage 285.

The accumulator 272 may act as a reservoir for storing any residual liquid refrigerant so that vapor refrigerant rather than liquid refrigerant may be provided to the pump 260. The accumulator 272 may include a desiccant that absorbs small amounts of water moisture from the refrigerant.

The interior heat exchanger 276 may be fluidly connected to the second expansion device 274. The interior heat exchanger 276 may be positioned inside the passenger compartment 220. In a cooling mode or air conditioning context, the interior heat exchanger 276 may function as an evaporator and may receive heat from air in the passenger compartment 220 to vaporize the refrigerant. Refrigerant exiting the interior heat exchanger 276 may be routed to the accumulator 272. In the heating mode, interior heat exchanger 276 is bypassed.

The ventilation subsystem 234 may circulate air in the passenger compartment 220 of the vehicle 10. The ventilation subsystem 234 may have a housing 290, a blower 292, and a temperature door 294.

The housing 290 may receive components of the ventilation subsystem 234. In FIG. 2, the housing 290 is illustrated such that internal components are visible rather than hidden for clarity. In addition, airflow through the housing 290 and internal components is represented by the arrowed lines 277. The housing 290 may be at least partially positioned in the passenger compartment 220. For example, the housing 290 or a portion thereof may be positioned under an instrument panel of the vehicle 10. The housing 290 may have an air intake portion 200 that may receive air from outside the vehicle 10 and/or air from inside the passenger compartment 220. For example, the air intake portion 200 may receive ambient air from outside the vehicle 10 via an intake passage, duct, or opening that may be located in any suitable location, such as proximate a cowl, wheel well, or other vehicle body panel. The air intake portion 200 may also receive air only from or more than a predetermined amount (e.g., 75%) from inside the passenger compartment 220 and recirculate such air through the ventilation subsystem 234 (e.g. recirculation mode). One or more doors or louvers may be provided to permit or inhibit air recirculation.

The blower 292 may be positioned in the housing 290. The blower 292, which may also be called a blower fan, may be positioned near the air intake portion 200 and may be configured as a centrifugal fan that may circulate air through the ventilation subsystem 234.

The temperature door 294 may be positioned between the interior heat exchanger 276 and the heater core 244. In the example shown, the temperature door 294 is positioned downstream of the interior heat exchanger 276 and upstream of the heater core 244. The temperature door 294 may block or permit airflow through the heater core 244 to help control the temperature of air in the passenger compartment 220. For example, the temperature door 294 may permit airflow through the heater core 244 in the heating mode such that heat may be transferred from the coolant to air passing through the heater core 244. This heated air may then be provided to a plenum for distribution to ducts and vents or outlets located in the passenger compartment 220. The temperature door 294 may be moved between a plurality of positions to provide air having a desired temperature. In FIG. 2, the temperature door 294 is shown in a full heat position in which airflow is directed through the heater core 244.

Figure 6:
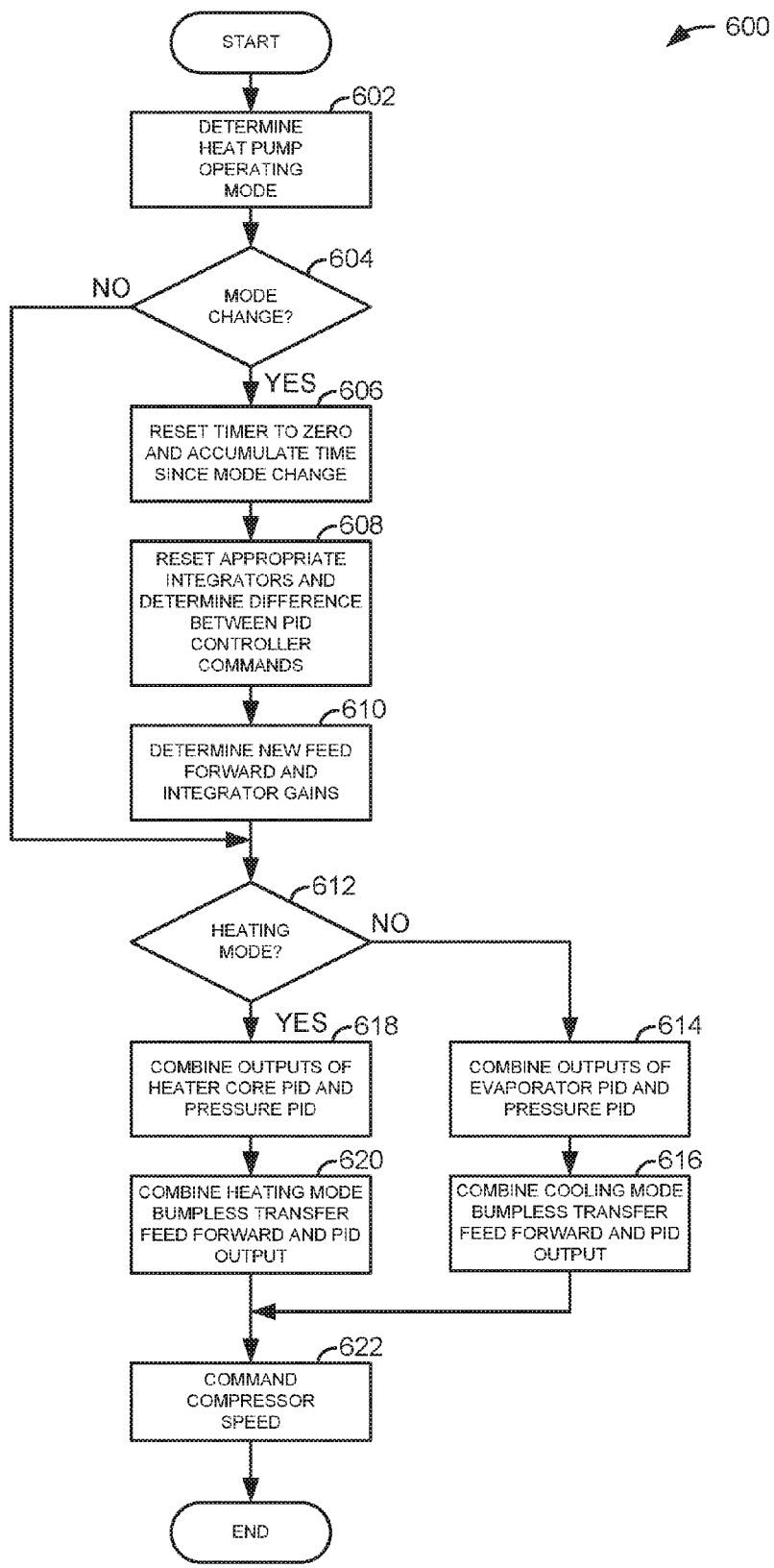
FIG. 6 shows a method for operating a heat pump system.

Controller 212 includes executable instructions of the method in FIG. 6 to operate the valves, fans, and pumps or compressors of the system shown in FIG. 2. Controller 212 includes inputs 201 and outputs 202 to interface with devices in the system of FIG. 2. Controller 212 also includes a central processing unit 205 and non-transitory memory 206 for executing the method of FIG. 6.

It should be noted that in some example systems, engine 12 and heater core 244 may not be present. In such systems, interior heat exchanger 276 may operate as a condenser in a heating mode and exterior heat exchanger 266 may operate as an evaporator. Consequently, in the method of FIG. 6 and the block diagram of FIG. 4, internal heat exchanger 276 may be substituted for heater core 244.

Referring now to FIG. 3, a block diagram of a vehicle driveline 300 in vehicle 10 is shown. Driveline 300 may be powered by engine 12. Engine 12 may be started with an engine starting system including starter 301 or via electric machine or driveline integrated starter generator (DISG) 14. Further, engine 12 may generate or adjust torque via torque actuator 309, such as a fuel injector, throttle, camshaft, etc.

An engine output torque may be transmitted to driveline disconnect clutch 304. Driveline disconnect clutch selectively couples and decouples driveline 300. Driveline disconnect clutch 304 may be electrically or hydraulically actuated. The downstream side of driveline disconnect clutch 304 is shown mechanically coupled to DISG input shaft 303.

DISG 14 may be operated to provide torque to driveline 300 or to convert driveline torque into electrical energy to be stored in electric energy storage device 11. DISG 14 has a power output that is greater than starter 301. Further, DISG 14 directly drives driveline 300 or is directly driven by driveline 300. There are no belts, gears, or chains to couple DISG 14 to driveline 300. Rather, DISG 14 rotates at the same rate as driveline 300 and may be mechanically coupled to transmission 308 via shaft 336. Electrical energy storage device 11 may be a battery, capacitor, or inductor. The downstream side of DISG 14 is mechanically coupled to transmission 308.

Automatic transmission 308 includes gear clutches 333 (e.g., gears 1-6) for adjusting a transmission gear ratio. The gear clutches 333 may be selectively engaged to propel vehicle 10. Torque output from the automatic transmission 308 may in turn be relayed to wheels 316 to propel the vehicle via output shaft 334. Output shaft 334 delivers torque from transmission 308 to wheels 316. Automatic transmission 308 may transfer an input driving torque to the wheels 316.

Further, a frictional force may be applied to wheels 316 by engaging wheel friction brakes 318. In one example, wheel friction brakes 318 may be engaged in response to the driver pressing his foot on a brake pedal (not shown). In other examples, controller 212 or a controller linked to controller 212 may engage wheel friction brakes. In the same way, a frictional force may be reduced to wheels 316 by disengaging wheel friction brakes 318 in response to the driver releasing his foot from a brake pedal. Further, vehicle brakes may apply a frictional force to wheels 316 via controller 212 as part of an automated engine stopping procedure.

Controller 212 may be programmed to receive inputs from engine 12 and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In all cases, engine control may be performed on a cylinder-by-cylinder basis to control the engine torque output. Controller 212 may also control torque output and electrical energy production from DISG by adjusting current flowing to and from DISG windings as is known in the art. Controller 212 may also include non-transitory memory for storing executable instructions of the method described in FIG. 6.

Thus, the system of FIGS. 1-3 provides for a vehicle system, comprising: a heat pump system; and a controller including executable instructions stored in non-transitory memory for providing a bumpless (e.g., no change in the command) compressor command between a transition between two different heat pump operating modes. The vehicle system includes where the bumpless compressor command is a command that remains at a same value when the heat pump system is transitioned between the two different heat pump operating modes. The vehicle system further comprises adjusting the compressor command in response to an amount of time since the transition between the two different heat pump operating modes. The vehicle system includes where a first mode of the two different modes is a heating mode and where a second mode of the two different modes is a cooling mode. The vehicle system further comprises additional executable instructions for switching the heat pump system between the two different heat pump operating modes. In some examples, the vehicle system further comprises additional executable instructions for providing the bumpless compressor command based on output values of two different PID controllers.

Figure 4:
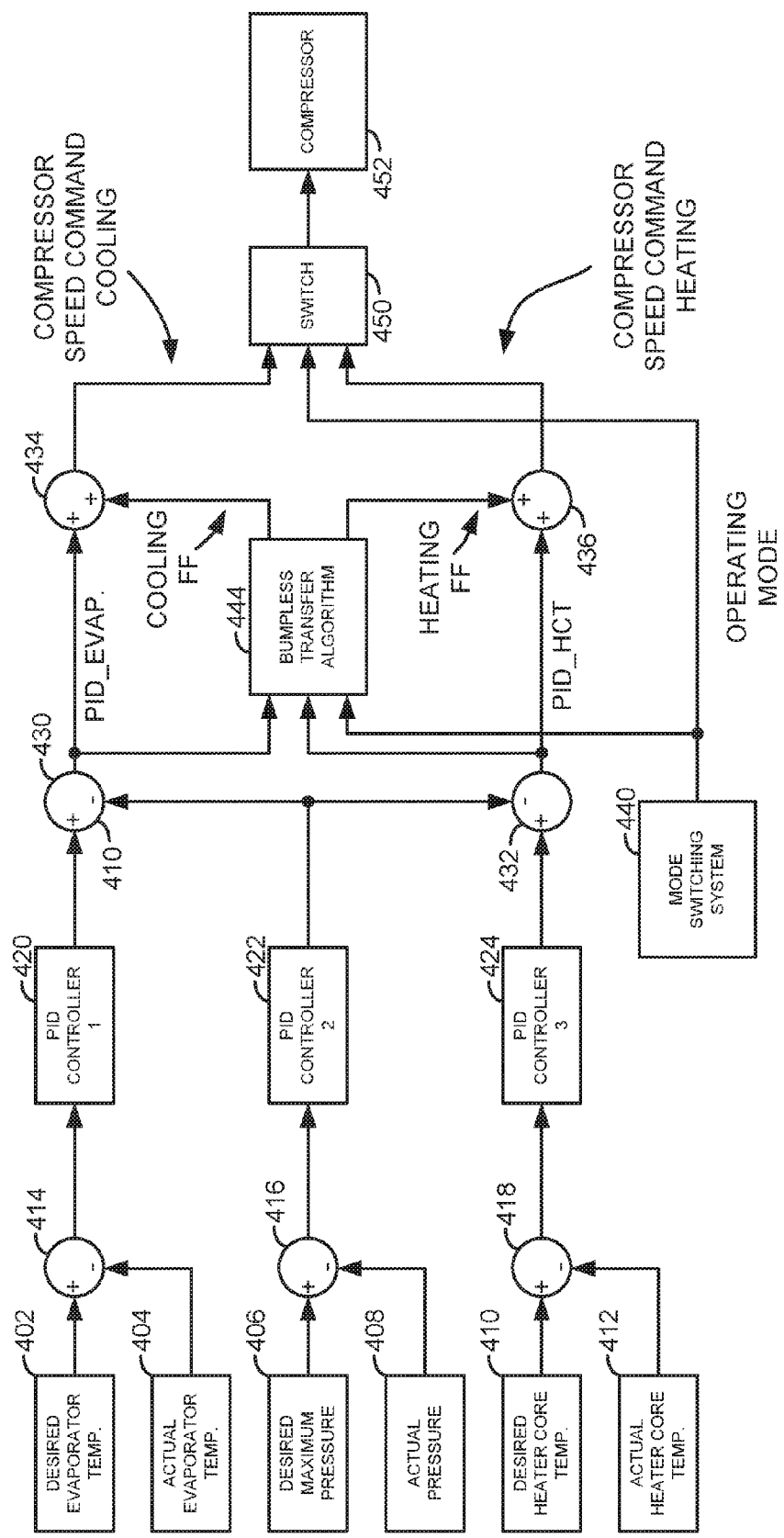
FIG. 4 shows an example controller block diagram for a heat pump.

Referring now to FIG. 4, a block diagram of an example heat pump controller is shown. Instructions for a controller as described in FIG. 4 may be included in the system of FIGS. 1-3 as executable instructions stored in non-transitory memory. Further, the controller illustrated in FIG. 4 along with the method of FIG. 6 may provide the sequence shown in FIG. 5.

Desired evaporator temperature for a cooling mode of an example heat pump as shown in FIG. 2 enters controller 400 at 402. The desired evaporator temperature may be stored in memory based on user (passenger) or controller input. Actual evaporator temperature enters controller 400 at 404. The actual evaporator temperature may be a temperature of fins of evaporator 276 as is shown in FIG. 2. The actual evaporator temperature may be determined via a temperature sensor. The actual evaporator temperature is subtracted from the desired evaporator temperature at summing junction 414 which outputs an evaporator temperature error. The evaporator temperature error is input into proportional/integral/derivative (PID) controller 420 which operates as an evaporator temperature controller. The evaporator temperature error is operated on by proportional, integral, and derivative gains. The PID controller sums proportional, integral, and derivative terms and supplies the result to summing junction 430.

Desired refrigerant pressure for the heat pump shown in FIG. 2 enters controller 400 at 406. The desired refrigerant pressure may be empirically determined and stored in memory. Actual refrigerant pressure enters controller 400 at 408. The actual refrigerant pressure may be determined via a pressure sensor as is shown in FIG. 2. The actual refrigerant pressure is subtracted from the desired refrigerant pressure at summing junction 416 which outputs a refrigerant pressure error. The refrigerant pressure error is input into proportional/integral/derivative (PID) controller 422 which operates as a refrigerant pressure controller. The refrigerant pressure error is operated on (e.g., multiplied) by proportional, integral, and derivative gains. The PID controller sums proportional, integral, and derivative terms and supplies the result to summing junctions 430 and 432.

Desired heater core temperature for the heat pump system shown in FIG. 2 enters controller 400 at 410. The desired heater core temperature may be empirically determined and stored in memory. Actual heater core temperature enters controller 400 at 412. The actual heater core temperature may be determined via a temperature sensor as is shown in FIG. 2. The actual heater core temperature is subtracted from the desired heater core temperature at summing junction 418 which outputs a heater core temperature error. The heater core temperature error is input into proportional/integral/derivative (PID) controller 424 which operates as a heater core temperature controller. The heater core temperature error is operated on (e.g., multiplied) by proportional, integral, and derivative gains. The PID controller sums proportional, integral, and derivative terms and supplies the result to summing junction 432.

The output of summing junction 430 is directed to summing junction 434 and bumpless transfer algorithm 444. Bumpless transfer algorithm 444 also provides input to summing junction 434, and output of summing junction 434 is supplied to switch 450. Similarly, output of summing junction 432 is directed to summing junction 436 and bumpless transfer algorithm 444. Bumpless transfer algorithm 444 provides output to summing junction 436, and output of summing junction 436 is supplied to switch 450.

Mode switching system 440 includes logic for determining when to switch between heat pump operating modes such as heating mode and cooling mode. Mode switching system 440 may choose to switch from heating mode to cooling mode or vice-versa in response to a driver's request, ambient and passenger cabin conditions, or in response to an automated climate control request. For example, if a driver wishes to increase passenger cabin temperature to a greater temperature than ambient temperature, mode switching system 440 may transitions the heat pump from cooling mode to heating mode. Further, mode switching system 440 may transition the heat pump from cooling mode to heating mode in response to a driver specifically requesting a change from cooling mode to heating mode via a climate control system interface.

Bumpless transfer algorithm 444, as described in further detail in FIG. 6, adjusts integral gains for the evaporator temperature PID controller, the refrigerant pressure PID controller, and the heater core temperature PID controller. The bumpless transfer algorithm also determines feed forward terms based on a difference output of the evaporator temperature PID controller and the heater core temperature PID controller. The feed forward evaporator temperature command is output to summing junction 434. The feed forward heater core temperature command is output to summing junction 436. Summing junction 434 provides the evaporator temperature command to switch 450, and summing junction 436 provides the heater core temperature command to switch 450.

Switch 450 provides either the evaporator temperature command or the heater core temperature command to the compressor, the other of which is not used to control the compressor. Compressor speed is controlled by the output of switch 450. Switch 450 is operated by input from mode switching system 440. If mode switching system 440 selects cooling mode, the evaporator temperature command is supplied to compressor 452 by switch 450. If mode switching system 440 selects heating mode, the heater core temperature command is supplied to compressor 452 by switch 450.

Figure 5:
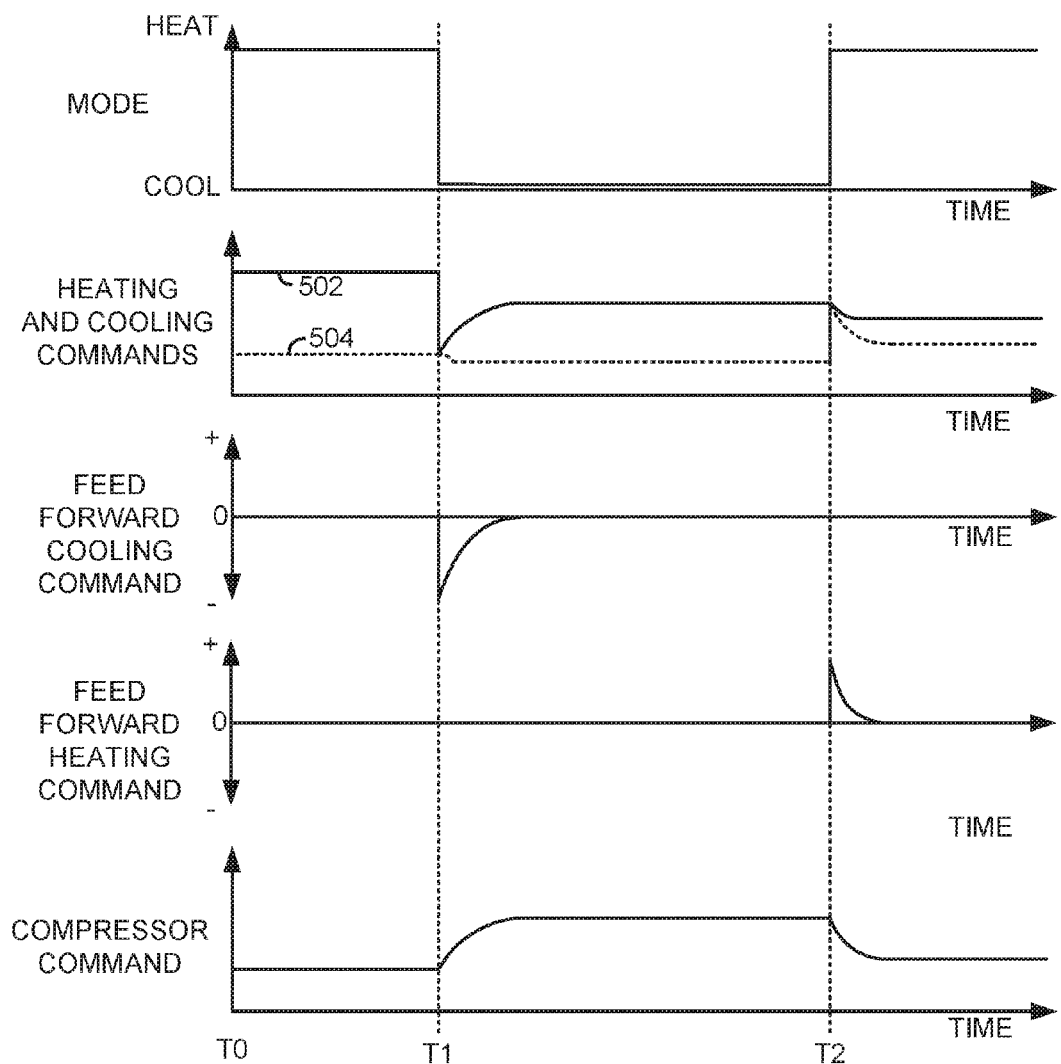
FIG. 5 shows an example simulated sequence for operating a vehicle heat pump system according to the method of FIG. 6.

Thus, controller 400 supplies control commands to compressor 452 based on a desired evaporator temperature and a desired refrigerant pressure in a cooling mode. Controller 400 also provides control commands to compressor 452 based on a desired heater core temperature and the desired refrigerant pressure in heating mode. Feed forward terms or control commands in heating and cooling modes are based on a difference in evaporator PID controller output and heater core PID controller output. The feed forward terms exponentially decay as a time since a mode switch increases as is shown in the sequence of FIG. 5. The commands are supplied to the compressor to provide a desired evaporator temperature or a desired heater core temperature.

Referring now to FIG. 5, a simulated sequence for operating a vehicle heat pump according to the method of FIG. 6 is shown. The sequence may be performed by the system shown in FIGS. 1-3.

The first plot from the top of FIG. 5 is a plot of heat pump mode versus time. The Y axis represents heat pump mode and the heat pump is in a heating mode when the trace is near the Y axis arrow. The heat pump is in a cooling mode when the trace is near the X axis. The X axis represents time and time increases from the left side of FIG. 5 to the right side of FIG. 5.

The second plot from the top of FIG. 5 is a plot of heating mode and cooling mode compressor commands versus time. The solid line 502 represents the cooling compressor command (e.g., output of summing junction 434 of FIG. 4). The dashed line 504 represents the heating compressor command (e.g., output of summing junction 436 of FIG. 4). The Y axis represents heating or cooling compressor command and heating and cooling commands increase in magnitude in the direction of the Y axis arrow. The X axis represents time and time increases from the left side of FIG. 5 to the right side of FIG. 5.

The third plot from the top of FIG. 5 is a plot of feed forward cooling command (e.g., output of bumpless transfer algorithm 444 that enters summing junction 434) versus time. The X axis represents time and time increases from the left side of FIG. 5 to the right side of FIG. 5.

The fourth plot from the top of FIG. 5 is a plot of feed forward heating command (e.g., output of bumpless transfer algorithm 444 that enters summing junction 436) versus time. The X axis represents time and time increases from the left side of FIG. 5 to the right side of FIG. 5.

The fifth plot from the top of FIG. 5 is a plot of the compressor command versus time. The magnitude of the compressor command increases in the direction of the Y axis arrow. The X axis represents time and time increases from the left side of FIG. 5 to the right side of FIG. 5. The compressor command is based on the cooling command and the heating command.

At time T0, the heat pump is in heating mode and the heating command is at a lower middle level. The cooling command is at a higher level based on a compressor speed to drive the actual evaporator temperature to a desired evaporator temperature. The feed forward cooling and heating commands are zero since a significant amount of time has elapsed since the mode change into heating mode. The compressor command is at a lower middle level since it is based on the heating command.

At time T1, the heat pump operating mode is changed from heating mode to cooling mode as indicated by the mode trace. The mode may change in response to driver input or in response to ambient and passenger cabin environmental conditions. The cooling command is a combination of an exponential feed forward term and the evaporator temperature PID control term, as such, it decreases to a same level as the heating command and it begins to increase exponentially to a higher level. The heating command output decreases in response to the heater core temperature. The feed forward cooling command, which the cooling command is based from, increases to a level based on a difference between the heating command and the cooling command. The feed forward cooling command then decreases exponentially in response to time since the mode change increasing. By decreasing the feed forward command, the compressor command starts at a command that is equivalent to the compressor command before the mode change. Thus, the compressor command provides a bumpless change in control between the heating and cooling modes. The compressor command is a combination of an exponential feed forward term and the heater core temperature PID control term, as such, it increases exponentially to a new constant value after a predetermined amount of time expires. The feed forward heating command remains at a value of zero.

At time T2, the heat pump operating mode is changed back from cooling mode to heating mode as indicated by the mode trace. The mode may change in response to driver input or in response to ambient and passenger cabin environmental conditions. The cooling command decreases exponentially by a small amount and levels off at a constant lower value; however, the cooling command may not decrease exponentially or by a small amount. The heating command output increases in a step like way and then it begins to decrease exponentially since it is formed from the exponential feed forward term and the PID controller output. The heating command is increased to a level of the cooling command at the time of the mode transition so that compressor speed does not change stepwise in response to the mode change. The feed forward cooling command remains at a value of zero and the feed forward heating command increases and then decreases exponentially. The compressor command is held at a constant value at the time of the mode transition and then it decays or is reduced exponentially after the mode changes from heating mode to cooling mode.

In this way, commands of two different modes may be a basis for a compressor command that does not change in an impulse or stepwise manner in response to a change from a heat pump transitioning from a heating mode to a cooling mode or vice-versa. Rather, the compressor command is maintained at a level during a heat pump mode change and then it increases or decreases exponentially to provide the desired heat pump output.

Referring now to FIG. 6, a method for operating a heat pump is shown. The method of FIG. 6 may be applied to the system of FIGS. 1-3. Further, the method of FIG. 6 may provide the operating sequence of FIG. 5. Additionally, the method of FIG. 6 may be stored as executable instructions in non-transitory memory of a controller.

At 602, method 600 determines a heat pump operating mode. The heat pump operating mode may be determined in response to driver or passenger inputs to a climate control system. For example, a driver may request heating mode by selecting heat on a climate control panel. Alternatively, method 600 may select the heat pump operating mode based on ambient environmental conditions and passenger cabin conditions. For example, method 600 may change the heat pump from cooling mode to heating mode when ambient temperature is less than a desired cabin temperature. Method 600 proceeds to 604 after the heat pump operating mode is selected.

At 604, method 600 judges if a heat pump mode change is requested. Method 600 may judge that a heat pump mode change is requested in response to a bit in memory changing state, and the bit may change state from a value of one in heating mode to a value of zero in cooling mode. If method 600 judges that a mode change is requested, the answer is yes and method 600 proceeds to 606. Otherwise, the answer is no and method 600 proceeds to 612.

At 606, method 600 resets a timer that accumulates time since a transition from one heat pump operating mode to a second heat pump operating mode. For example, the timer accumulates time since the heat pump changes from heating mode to cooling mode or vice-versa. Method 600 begins to perform operations to provide a bumpless command transfer between heating and cooling modes or vice-versa at steps 606 to 610. Bumpless transfer is an operation that provides a same compressor command after a heat pump mode change as before the heat pump mode change. The compressor command may change as time since the mode change increases, but it is held constant during the actual heat pump mode change. By maintaining the compressor command during a heat pump mode change, it is possible to change heat pump operating modes without causing a significant change in the compressor command even though the system changes from a heating mode to a cooling mode. Method 600 proceeds to 608 after the timer is reset.

At 608, method 600 resets appropriate PID integrators and it determines a difference between PID controller commands. For example, if the heat pump mode change is from a heating mode to a cooling mode, method 600 resets to zero the integrators of the refrigerant pressure control PID controller (e.g., PID controller 2 of FIG. 4) and the heater core temperature PID controller (e.g., PID controller 3 of FIG. 4). Method 600 also determines a difference in the output of a heating command based on desired heater core temperature (e.g., output of summing junction 430 of FIG. 4) and a cooling command based on desired evaporator temperature (e.g., output of summing junction 432 of FIG. 4). In particular, method 600 subtracts the cooling command value from the heating command value to determine a PID controller output difference.

On the other hand, if method 600 changes the heat pump operating mode from cooling mode to heating mode, method 600 resets to zero the integrators of the refrigerant PID controller (e.g., PID controller 2 of FIG. 4) and the evaporator temperature PID controller (e.g., PID controller 1 of FIG. 4). Method 600 also determines a difference in the output of a heating command based on desired heater core temperature (e.g., output of summing junction 430 of FIG. 4) and a cooling command based on desired evaporator temperature (e.g., output of summing junction 432 of FIG. 4). In particular, method 600 subtracts the heating command value from the cooling command value to determine a PID controller output difference. Method 600 proceeds to 610 after the appropriate integrators are reset and the difference between heating and cooling commands is determined.

At 610, method 600 determines new feed forward cooling or heating mode terms or command values and integrator gain values responsive to the heat pump mode change request. If the heat pump mode changes from heating to cooling, method 600 determines the cooling feed forward command which is the value e to the power of a predetermined constant −Ke1 multiplied by time, and the result is multiplied by the cooling command value minus the heating command value (e.g., Cooling_FF=(PID_EVAP−PID_HCT)*exp(−Ke1*time) where Cooling_FF is the feed forward cooling command, PID_EVAP is output of summing junction 430, PID_HCT is output of summing junction 432, time is the amount of time since the heat pump mode transition, exp represents the constant e (e.g., 2.718), and Ke1 is a predetermined gain). The evaporator PID controller integrator gain is Integral_Gain1=Ki1*(1−exp(−Ke1*time)), where Integral_Gain1 is the evaporator integrator gain, Ki1 is a predetermined integrator gain, exp is the constant e, time is the amount of time since the heat pump mode transition. The refrigerant integrator gain is given by Integral_Gain2=Ki2*(1−exp(−Ke1*time)), where Ki2 is a predetermined gain and the remaining terms are as described previously.

If the heat pump mode changes from cooling to heating, method 600 determines the heating feed forward command which is the value e to the power or a predetermined constant −Ke2 multiplied by time, multiplied by the heating command value minus the cooling command value (e.g., Heating_FF=(PID_HCT−PID_EVAP)*exp(−Ke2*time) where Heating_FF is the feed forward heating command, PID_EVAP is output of summing junction 430, PID_HCT is output of summing junction 432, time is the amount of time since the heat pump mode transition, and Ke2 is a predetermined gain). The heater core temperature PID controller integrator gain is Integral_Gain3=Ki3*(1−exp(−Ke2*time)), where Integral_Gain3 is the heater core temperature integrator gain, Ki3 is a predetermined gain, Ki2 is a predetermined integrator gain, exp is the value e, time is the amount of time since the heat pump mode transition. The refrigerant integrator gain is given by Integral_Gain2=Ki2*(1−exp(−Ke2*time)), where the terms are as described previously. Method 600 proceeds to 612 after integrator gains and feed forward values are determined.

At 612, method 600 judges if method 600 is in a heating mode. In one example, method 600 judges that the heat pump is in a heating mode based on a value of a bit stored in memory. For example, if the bit has a value of one, the answer is yes and method 600 proceeds to 618. Otherwise, the answer is no and method 600 proceeds to 614.

At 618, method 600 provides a heater core temperature error to a heater core temperature PID controller (e.g., 424 of FIG. 4). Method 600 provides refrigerant pressure error to a refrigerant pressure PID controller (e.g., 422 of FIG. 4). Method 600 also adds the output of the heater core temperature PID controller and the refrigerant pressure PID controller as shown at 432 of FIG. 4. Method 600 proceeds to 620 after the PID controller outputs are added together.

At 620, method 600 adds the sum of the refrigerant pressure PID controller and the heater core temperature PID controller to the heating mode feed forward command determined at 610 as shown at 436 of FIG. 4. The heating mode feed forward command is output from the bumpless transfer algorithm described at 606 to 610.

At 622, method 600 outputs the compressor command. The compressor command may be the sum of the refrigerant pressure PID controller output, the heater core temperature PID controller output, and the heating mode feed forward command determined at 610 if the heat pump is in heating mode. Alternatively, the compressor command may be the sum of the refrigerant pressure PID controller output, the evaporator temperature PID controller output, and the cooling mode feed forward command determined at 610 if the heat pump is in cooling mode. The compressor command operates on the compressor to increase, decrease, or maintain compressor speed.

At 614, method 600 provides an evaporator temperature error to an evaporator temperature PID controller (e.g., 420 of FIG. 4). Method 600 provides refrigerant pressure error to a refrigerant pressure PID controller (e.g., 422 of FIG. 4). Method 600 also adds the output of the evaporator temperature PID controller and the refrigerant pressure PID controller as shown at 430 of FIG. 4. Method 600 proceeds to 616 after the PID controller outputs are added together.

At 616, method 600 adds the sum of the refrigerant pressure PID controller and the evaporator temperature PID controller to the cooling mode feed forward command determined at 610 as shown at 434 of FIG. 4. The cooling mode feed forward command is output from the bumpless transfer algorithm described at 606 to 610.

Thus, a heat pump compressor command may be held to a constant value during a heat pump mode change so that the heat pump compressor speed is not needlessly moved between control values during a heat pump mode change. The heat pump compressor command may change as time increases from a time of the mode change so that the compressor command converges to a command that provides a desired evaporator temperature or a desired heater core temperature. By eliminating or reducing heat pump compressor command changes during heat pump mode changes, it may be possible to extend compressor life and reduce the possibility of heat pump degradation.

The method of FIG. 6 may provide for a heat pump method, comprising: commanding a compressor to provide a desired evaporator temperature in response to output of an evaporator temperature controller and output of a refrigerant pressure controller in a first heat pump operating mode; and commanding the compressor to provide a desired heater core temperature in response to output of a heater core temperature controller and output of the refrigerant pressure controller in a second heat pump operating mode. The method includes where the first heat pump operating mode is a cooling mode, and where the second heat pump mode is a heating mode. The method further comprises adding a cooling feed forward command to the output of the evaporator temperature controller in the first heat pump operating mode. The method further comprises adding a heating feed forward command to the output of the heater core temperature controller in the second heat pump operating mode.

In some examples, the method further comprises adjusting integrator gains in response to transitioning from the first heat pump operating mode to the second heat pump operating mode. The method further comprises resetting an integrator output to zero in response to transitioning from the first heat pump operating mode to the second heat pump operating mode. The method further comprises switching commanding the compressor to provide the desired evaporator temperature to commanding the compressor to provide the desired heater core temperature in response to a request to change a heat pump operating mode.

The method of FIG. 6 also provides for a heat pump method, comprising: providing a compressor command via adjusting a sum of a first proportional/integral/derivative (PID) controller output and a second PID controller output based on a difference between the sum of the first PID controller output and the second PID controller output and a sum of a third PID controller output and the second PID controller output; and operating a compressor in response to the compressor command. The method includes where the first PID controller outputs a command based on evaporator temperature, where the second PID controller outputs a command based on refrigerant pressure, and where the third PID controller outputs a command based on heater core temperature.

In some examples, the method further comprises adjusting the sum of the first PID controller and the second PID controller based on a decaying exponential time based term. The method further comprises zeroing integrators of the second PID controller and the third PID controller in response to transitioning to a heat pump cooling mode where the compressor command is provided. The method further comprises adjusting integral gains of the first PID controller and the second PID controller in response to transitioning to the heat pump cooling mode. The method also further comprises providing the compressor command via adjusting a sum of the third PID controller output and the second PID controller output based on a heating feed forward command. The method further comprises providing the compressor command via multiplying the sum of the third PID controller output and the second PID controller output by a decaying exponential term.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description.

The invention claimed is:

1. A vehicle system, comprising:
a heat pump system; and
a controller including executable instructions stored in non-transitory memory for providing a compressor command for a bumpless transfer between a transition between two different heat pump operating modes and adjusting the compressor command in response to an amount of time since the transition between the two different heat pump operating modes.

2. The vehicle system of claim 1, where the compressor command is a command that remains at a same value during the transition between the two different heat pump operating modes.

3. The vehicle system of claim 1, where a first mode of the two different modes is a heating mode and where a second mode of the two different modes is a cooling mode.

4. The vehicle system of claim 1, further comprising additional executable instructions for switching the heat pump system between the two different heat pump operating modes.

5. The vehicle system of claim 1, further comprising additional executable instructions for providing the compressor command for the bumpless transition based on output values of two different PID controllers.

6. The vehicle system of claim 5, wherein the output values of the two different PID controllers are summed.

7. The vehicle system of claim 1, further comprising additional executable instructions for providing the compressor command for the bumpless transition based on output values of three different PID controllers.

8. The vehicle system of claim 7, wherein the output values are a first sum of first and second PID controllers and a second sum of second and third PID controllers.

9. The vehicle system of claim 7, wherein one or more output values are adjusted based on a decaying exponential time based term.

10. The vehicle system of claim 1, wherein the compressor command is based on outputs of two or more PID controllers.

11. The vehicle system of claim 10, comprising additional executable instructions for adjusting gains of at least one of the two or more PID controllers in response to the transition between the two different heat pump operating modes.

* * * * *